United States Patent
Kamble et al.

(10) Patent No.: US 11,005,785 B2
(45) Date of Patent: *May 11, 2021

(54) SEGMENTATION AND REASSEMBLY OF NETWORK PACKETS FOR SWITCHED FABRIC NETWORKS

(71) Applicant: International Business Machines Corporation, Armonk, NY (US)

(72) Inventors: Keshav G. Kamble, Fremont, CA (US); Dar-Ren Leu, San Jose, CA (US); Vijoy Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,265

(22) Filed: Jul. 29, 2019

(65) Prior Publication Data
US 2019/0356610 A1 Nov. 21, 2019

Related U.S. Application Data

(63) Continuation of application No. 15/639,048, filed on Jun. 30, 2017, now Pat. No. 10,581,761, which is a
(Continued)

(51) Int. Cl.
*H04L 12/879* (2013.01)
*H04L 12/947* (2013.01)

(52) U.S. Cl.
CPC .......... *H04L 49/901* (2013.01); *H04L 49/256* (2013.01)

(58) Field of Classification Search
CPC ......... H04L 49/9057; H04L 2012/5652; H04L 29/06136; H04L 69/166; H04L 5/0035;
(Continued)

(56) References Cited

U.S. PATENT DOCUMENTS

| 5,446,726 A * | 8/1995 | Rostoker | G06F 13/128 |
| | | | 348/E5.002 |
| 6,704,794 B1 * | 3/2004 | Kejriwal | H04L 29/06 |
| | | | 370/392 |

(Continued)

FOREIGN PATENT DOCUMENTS

| KR | 2008083827 A | 9/2008 |
| KR | 2010116458 A | 11/2010 |

OTHER PUBLICATIONS

Iyer, S. et al., "ClassiPI: An Architecture for Fast and Flexible Packet Classification," IEEE Network, Mar./Apr. 2001, pp. 33-41, vol. 15, No. 2, IEEE, United States.
(Continued)

*Primary Examiner* — Jung Liu
(74) *Attorney, Agent, or Firm* — Sherman IP LLP; Kenneth L. Sherman; Hemavathy Perumal

(57) ABSTRACT

Reassembly of member cells into a packet comprises receiving an incoming member cell of a packet from a switching fabric wherein each member cell comprises a segment of the packet and a header, generating a reassembly key using selected information from the incoming member cell header wherein the selected information is the same for all member cells of the packet, checking a reassembly table in a content addressable memory to find an entry that includes a logic key matching the reassembly key, and using a content index in the found entry and a sequence number of the incoming member cell within the packet, to determine a location offset in a reassembly buffer area for storing the incoming member cell at said location offset in the reassembly buffer area for the packet for reassembly.

18 Claims, 5 Drawing Sheets

Related U.S. Application Data continuation of application No. 14/554,599, filed on Nov. 26, 2014, now Pat. No. 9,774,547, which is a continuation of application No. 13/619,158, filed on Sep. 14, 2012, now Pat. No. 8,942,258.

(58) Field of Classification Search
CPC . H04L 5/0055; H04L 5/0057; H04L 12/2869; H04L 12/5695; H04L 47/00; H04L 47/70; H04L 47/78; H04L 47/821; H04L 47/827; H04W 72/04
See application file for complete search history.

(56) References Cited

U.S. PATENT DOCUMENTS

| | | | | |
|---|---|---|---|---|
| 6,781,992 | B1 * | 8/2004 | Rana | H04L 47/10 370/394 |
| 7,424,014 | B2 * | 9/2008 | Mattes | H04L 45/00 370/389 |
| 7,424,571 | B2 * | 9/2008 | Sikdar | H04L 45/742 710/52 |
| 7,447,777 | B1 * | 11/2008 | Singh Ahuja | H04L 12/66 709/227 |
| 7,522,625 | B2 * | 4/2009 | Abe | H04L 49/90 370/413 |
| 7,551,617 | B2 * | 6/2009 | Eatherton | H04L 47/56 370/392 |
| 7,643,486 | B2 * | 1/2010 | Belz | H04L 47/21 370/392 |
| 7,715,419 | B2 * | 5/2010 | Tatar | H04L 49/1546 370/419 |
| 7,729,351 | B2 | 6/2010 | Tatar et al. | |
| 7,760,719 | B2 * | 7/2010 | Yik | H04L 49/3063 370/389 |
| 7,792,027 | B2 | 9/2010 | Tatar et al. | |
| 7,809,009 | B2 | 10/2010 | Tatar et al. | |
| 7,843,930 | B2 | 11/2010 | Mattes et al. | |
| 7,864,791 | B2 | 1/2011 | Tatar et al. | |
| 7,991,007 | B2 * | 8/2011 | Agarwal | H04L 69/16 370/474 |
| 8,218,538 | B1 * | 7/2012 | Chidambaram | H04L 47/6215 370/386 |
| 8,243,618 | B2 * | 8/2012 | Battestilli | H04L 49/351 370/252 |
| 8,571,024 | B2 | 10/2013 | Tatar et al. | |
| 2006/0026378 | A1 | 2/2006 | Sikdar et al. | |
| 2006/0039379 | A1 * | 2/2006 | Abe | H04L 49/90 370/394 |
| 2006/0155875 | A1 * | 7/2006 | Cheriton | G06F 16/90339 709/245 |
| 2006/0274742 | A1 * | 12/2006 | Pong | H04L 69/16 370/389 |
| 2007/0223483 | A1 * | 9/2007 | Huang | H04L 49/9021 370/394 |
| 2011/0019670 | A1 | 1/2011 | Mattes et al. | |
| 2014/0079076 | A1 * | 3/2014 | Kamble | H04L 49/9057 370/474 |

OTHER PUBLICATIONS

U.S. Non-Final Office Action for U.S. Appl. No. 13/619,158 dated Feb. 12, 2014.
U.S. Final Office Action for U.S. Appl. No. 13/619,158 dated Jun. 23, 2014.
U.S. Notice of Allowance for U.S. Appl. No. 13/619,158 dated Aug. 29, 2014.
U.S. Non-Final Office Action for U.S. Appl. No. 13/619,283 dated Feb. 11, 2014.
U.S. Final Office Action for U.S. Appl. No. 13/619,283 dated Jun. 23, 2014.
U.S. Notice of Allowance for U.S. Appl. No. 13/619,283 dated Sep. 3, 2014.
U.S. Non-Final Office Action for U.S. Appl. No. 14/554,599 dated Mar. 6, 2017.
U.S. Notice of Allowance for U.S. Appl. No. 14/554,599 dated May 22, 2017.
U.S. Corected Notice of Allowability for U.S. Appl. No. 14/554,599 dated Jun. 5, 2017.
U.S. Non-Final Office Action for U.S. Appl. No. 15/639,048 dated Sep. 18, 2018.
U.S. Final Office Action for U.S. Appl. No. 15/639,048 dated Apr. 2, 2019.
U.S. Notice of Allowance for U.S. Appl. No. 15/639,048 dated Jun. 12, 2019.

* cited by examiner

SEGMENTATION AND REASSEMBLY OF NETWORK PACKETS FOR SWITCHED FABRIC NETWORKS

BACKGROUND

Field of the Invention

The present invention relates generally to packet processing, and in particular, to packet segmentation and reassembly in switching fabric networks.

Description of Related Art

A network switching system comprises one or more switch fabric modules, such as Application Specific Integrated Circuits (ASICs), and a plurality of network switching modules. A network switching module redirects incoming data on one network node, out to another network node via the switch fabric module(s).

A network switching module performs segmentation and reassembly of network packets such as Ethernet packets. Segmentation fragments a packet, such as variable length packet, into fixed length cells to be transported across a switched fabric. Thereafter, the cells are reassembled to reconstitute the original packet.

A packet is segmented into fragments where each fragment is a fixed sized cell (e.g., 128 bytes or 256 bytes). All the fragments of specific packets are called member cells of that packet. Each cell gets a fixed or variable sized header. The header is formed from packet pre-classification information added by the ingress packet processor. A packet context is a buffer (i.e., packet buffer context) where member cells which completely match the criteria of membership of a packet are put together. The context is a function of 10 to 100 various parameters of packets and cells. An example minimum algorithm complexity for reassembling packets is in the order of O(mn) where m is the time it takes to search for a packet buffer context and n is the number of parameters used to find the packet buffer context. As such, logic to perform segmentation and reassembly is time consuming and adds significant latency in packet forwarding in the network.

BRIEF SUMMARY

One embodiment comprises segmentation and reassembly of network packets into cells for sending them over to cell switched fabric networks to achieve fixed/constant latency. One embodiment comprises segmentation of a packet into member cells and reassembly of the member cells for a given packet buffer context, in a cell-based distributed system.

According to embodiments of the invention, a process for reassembly of member cells into a packet comprises receiving an incoming member cell of a packet from a switching fabric wherein each member cell comprises a segment of the packet and a header, generating a reassembly key using selected information from the incoming member cell header wherein the selected information is the same for all member cells of the packet, checking a reassembly table in a content addressable memory to find an entry that includes a logic key matching the reassembly key, and using a content index in the found entry and a sequence number of the incoming member cell within the packet, to determine a location offset in a reassembly buffer area for storing the incoming member cell at said location offset in the reassembly buffer area for the packet for reassembly.

The reassembly process further includes maintaining a reassembly table in a content addressable memory, wherein the reassembly table includes one or more entries corresponding to one or more packets, and wherein each entry comprises a logic key for a corresponding packet and a content index into a reassembly buffer area for storing incoming member cells of that packet.

Maintaining the reassembly table includes, in response to an incoming member cell of a packet, if the incoming member cell is a Start of Packet (SOP) cell of a packet or if the incoming cell lookup key is not found in the reassembly table, generating a new logic key using selected information from the incoming cell header wherein the selected information is the same for all member cells of the packet, allocating an area of the reassembly buffer for storing member cells of the packet, and placing a new entry into the reassembly table. The new entry includes said new logic key and a new content index into the reassembly buffer area for storing incoming member cells of that packet.

The packet is reassembled using the stored member cells in the reassembly buffer area for the packet using cell offset number or sequence number from cell header. The cell offset number with respect to the packet is unique for each member cell. The cell offset number or sequence number is not included in the reassembly key formation. The switching fabric comprises a switched fabric in a distributed information technology environment.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. One or more exemplary embodiments of the invention are described below in detail. The disclosed embodiments are intended to be illustrative only since numerous modifications and variations therein will be apparent to those of ordinary skill in the art.

Embodiments of the invention relate to packet processing including processing of network packets in switched fabric networks information technology environments. One embodiment comprises low overhead segmentation and reassembly of network packets for reducing data communication latency in switched fabric networks. One embodiment comprises segmentation of an Ethernet packet into member cells and reassembly of the member cells for a given packet buffer context, in a cell-based distributed system.

According to an embodiment of the invention, process for reassembly of member cells into a packet comprises obtaining a SOP cell or any first out of sequence cell of a new packet, constructing an associated packet buffer context, receiving member cells of that packet, copying the member cells without headers and placing them in sequence in the packet buffer context, and after all the member cells are in the buffer, providing content of the packet buffer context as the reassembled packet for further processing.

Figure 1:
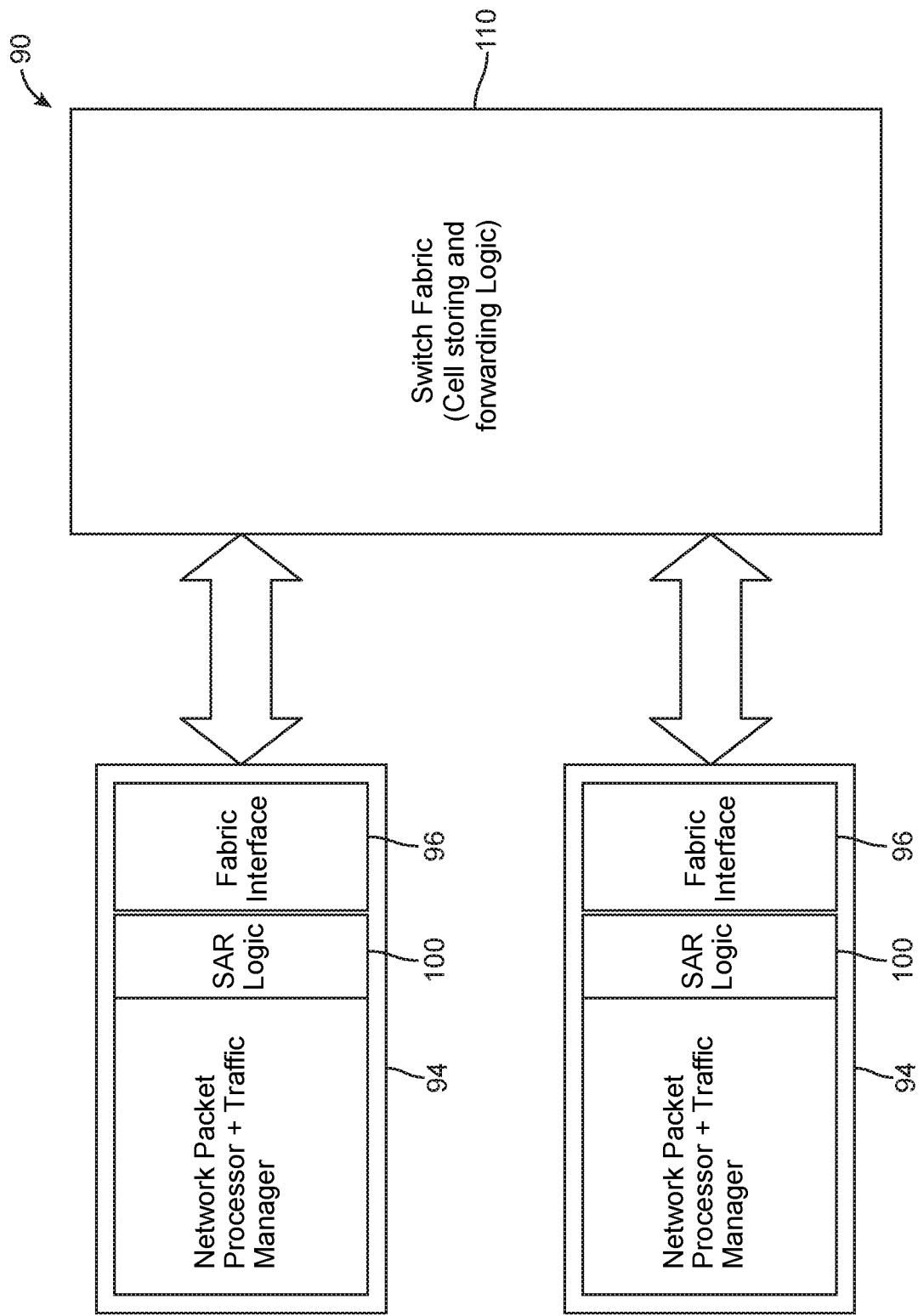
FIG. 1 is a block diagram illustrating an example network switching system including a packet processing system, according to an embodiment of the invention.

Exemplary embodiments of a packet processing system according to the present invention are described herein below. FIG. 1 shows a block diagram of a network a network switching system 90, comprising one or more switch fabric modules 110, and a plurality of network switching modules 94. In one embodiment, each of the modules 110 and 94 comprises an Application Specific Integrated Circuit (ASIC). Each network switching module 94 redirects incoming data on one network node, out to another network node via the switch fabric module(s).

As shown in FIG. 1, each network switching module 94 is connected to the switch fabric module 110 via a fabric interface 96. Latency in the network 90 includes the time required for a packet to traverse the network from a source (transmitter) to a destination (receiver). One component of latency involves segmentation and reassembly of network packets in each networking switch 94.

A networking switch 94 accepts network packets from various port interfaces. For each packet it performs look up operation which is part of packet processing. Based on packet processing operations, it appends a pre-classification header on each packet. The pre-classification header allows packet processing by other logic in the network switch. Before the whole packet with pre-classification information is sent to the switch fabric 110 via fabric interface 96, Segmentation and Reassembly (SAR) Logic 100 fragments the packet into one or more fixed sized cells. The cells follow a format which is understood by the switch fabric logic.

Figure 2:
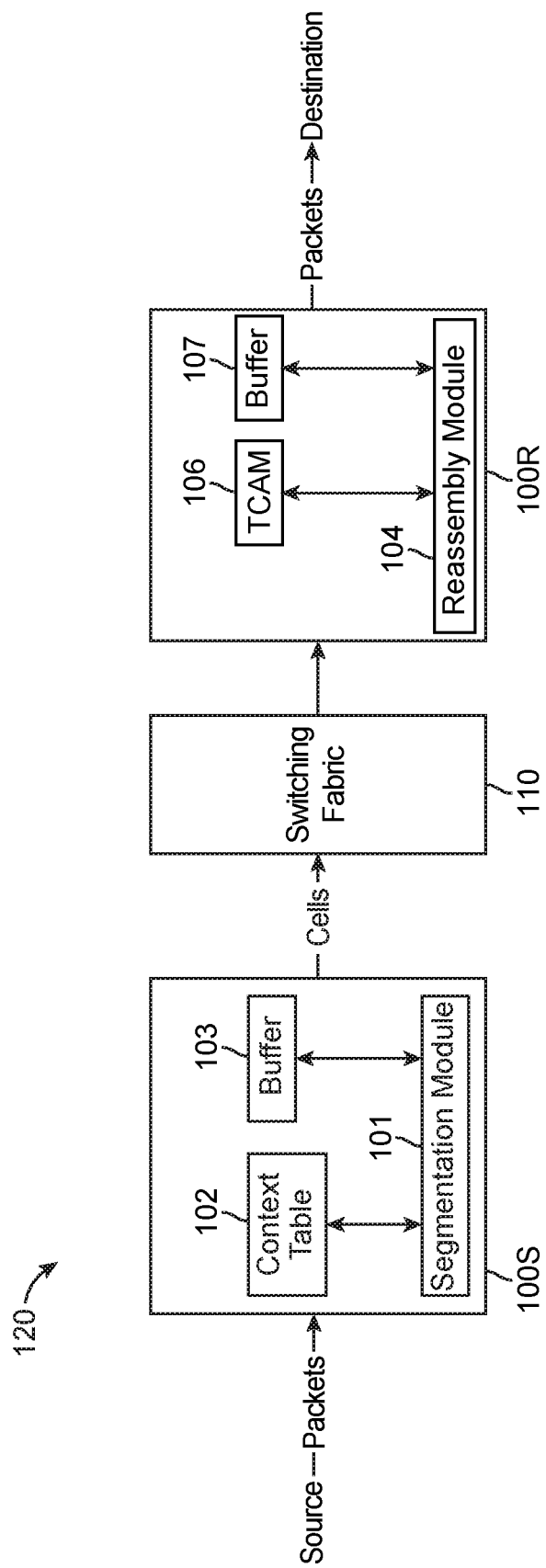
FIG. 2 is a block diagram illustrating an example architecture including a packet processing system, according to an embodiment of the present invention.

FIG. 2 shows a segmentation and reassembly architecture 120 wherein a SAR logic module 100 comprises a segmentation system 100S that implements segmentation of packets into member cells, and a reassembly system 100R that implements reassembly of member cells into a packet, according to the invention. The segmentation system 100S operates independent of a reassembly system 100R. Multiple segmentation systems 100S may be connected to the switching fabric 110. Similarly multiple reassembly systems 100R may be connected to the switching fabric 110.

Each segmentation system 100S and each reassembly system 100R communicate with a switching fabric 110. In one embodiment of the invention, the architecture 120 may be implemented across a distributed system. In one embodiment of the invention, the architecture 120 may be implemented within a communication switch, such as detailed in relation to FIG. 5 described further below.

The segmentation system 100S includes a segmentation module 101, a context table 102 and a buffer 103. The segmentation module 101 includes segmentation logic. The segmentation system 100S receives packets, such as Ethernet packets, wherein the segmentation module 101 segments each packet into member cells for transport over the switching fabric 110, wherein the switching fabric 110 routes each cell to an appropriate reassembly system 100R for reassembly into a packet. A cell comprises a header and a payload. The context table 102 provides the status of each received packet.

In one embodiment, the segmentation module 101 segments an incoming packet at 256B cell boundaries, wherein the last cell of the packet may be either 256B or 128B depending upon the size of the last cell in the packet. Common elements of the cell header in a given packet can be saved in buffer 103 as a common structure. As the segmentation module 101 concatenates the cell header to a cell payload, the common structure is also included, along with a (recalculated) sequence number and parity information for error correction.

Further, a reassembly system 100R comprises a segmentation module 101, a reassembly module 104, a content addressable memory 106 such as a TCAM, and a buffer 107. TCAM is a ternary content addressable memory. With a content addressable memory, the data is provided to the content addressable memory, and the content addressable memory returns a list of addresses where the data is stored, if found. Content addressable memory searches the entire memory in one operation. When a generated reassembly key is provided to the TCAM and in one operation the TCAM returns an entry in the reassembly table where a matching logic key is stored, if found. The algorithmic complexity of TCAMs search algorithm is O(1).

For reassembly, matching a cell to a packet is based on certain contexts. Each cell context is checked and if it matches a buffer context the cell belongs to, then the cell is stored in that buffer context for reassembling a packet.

Figure 3:
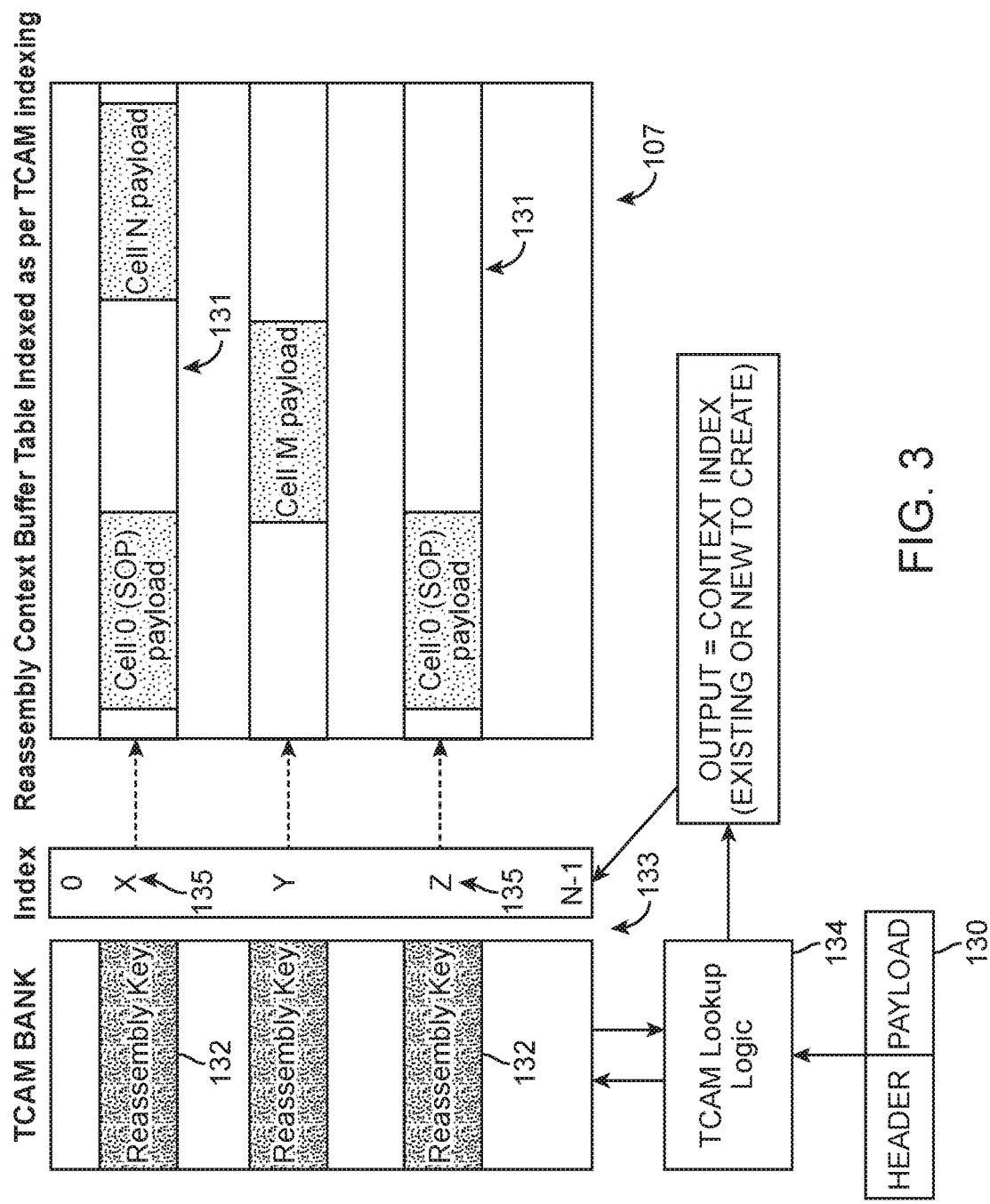
FIG. 3 is a block diagram illustrating an example reassembly module of a packet processing system, according to an embodiment of the present invention.

FIG. 3 illustrates an example operation of the reassembly system 100R according to a reassembly logic of the reassembly module 104. When a SOP cell arrives at the reassembly system 100R, there is no context, and there is no content index in the TCAM table 133. As such, for a SOP cell of a new packet, a new reassembly logic key 132, and corresponding content index 135, is created and stored in a TCAM table 133.

A reassembly logic key 132 for a cell is created using tuples (i.e., ordered lists of elements) which are extracted from the cell header elements. The elements in the cell header include Source port, Destination port, COS, Unicast/

Multicast bits, Source device ID, Destination device ID, Policer match, Vlan tag, Sequence number, packet id, Cell size and parity. A sequence number of the cell is not used in generating the logic key 132. The logic key 132 is placed in a TCAM table 133 comprising a TCAM bank in the TCAM 106. The logic key 132 includes those elements of the cell header that do not change across the different cells in a given packet. The sequence number (i.e., the sequence of the cell in a given packet) is not used to create the logic key 132.

Further, a reassembly packet buffer context 131 is constructed in the reassembly buffer 107 where the SOP cell is stored. The packet buffer context 131 has an associated content index 135 which indicates location of the packet buffer context 131 in the buffer 107. For each logic key 132 there is a corresponding content index 135 in the TCAM table 133. In one example, a content index X is associated with (or maps to) a first packet buffer context 131 (buffer segment), a content index Y is associated with (or maps to) a second packet buffer context 131, a content index Z is associated with (or maps to) a third packet buffer context 131, etc. As such, each content index corresponds to a packet buffer context 131 where cells of the same context are stored for reassembly purposes.

As such, for a new logic key 132, the TCAM table 133 is also populated with a content index 135 for a new packet buffer context 131. For all subsequent cells of as packet, TCAM table lookups for existing logic keys provide content indices of the already created packet buffer contexts 131.

Generally, the logic key serves as a way to lookup can index in the TCAM table for an incoming cell 130. The lookup logic finds context index of reassembly context (i.e., packet buffer context 131) for each incoming cell based on context of that cell.

Each cell carries a sequence number which identifies its sequence in the packet. The sequence number is an offset into the associated packet buffer context 131 where the cell is stored. The sequence number is not part of the logic key.

A logic key 132 is used as input to a TCAM lookup logic 134 for the TCAM table 133. For a given logic key 132, the TCAM lookup logic looks up a content index 135 in the TCAM table, wherein the content index is an index into the buffer 107 where a packet buffer context 131 for an incoming cell resides. As such, the content index 135 are offsets into the buffer 107 for the packet buffer contexts 131 of incoming cells (e.g., Cell 0, . . . , Cell N).

As successive cells arrive, logic keys are created using tuples. For example, as a cell arrives into egress, tuples are extracted from the cell header to create a logic key, and the logic key is used in the TCAM lookup table to lookup index of a packet buffer context 131 associated with the cell. Since this is a consecutive (or successive) cell (not a SOP) of the packet, the TCAM logic 134 uses the logic key to look into TCAM table for a context index 135 to the packet buffer context 131 associated with the cell. The found content index provides an offset to the buffer 107 where a packet buffer context 131 for the incoming cells for the packet are stored.

Once a context index 135 for a corresponding packet buffer context 131 of an incoming cell is found, the cell sequence number is used to find the offset for that cell in the packet buffer context 131 in the reassembly buffer 107, and to store the cell in that offset in the packet buffer context 131. As such, the sequence number of the cells is an offset into the packet buffer context 131 associated with the cell.

Storing the cell includes linking the cell into the corresponding packet context buffer 131 based on the index 135 into the reassembly buffer 107, using the sequence number of the cells act as offset into the context buffer 131. As such the cell header is removed, and the cell is linked into the packet context buffer 131 as the packet is reassembled. A count of the cells for each packet context buffer is maintained, wherein the entire packet is considered reassembled when the required cell count for the packet is reached. At this point egress processing for the assembled packet can begin. In the above lookup logic, the algorithm complexity for lookup into the TCAM is O(1).

Ingress processing (e.g., segmentation system 100S) creates cells from packets and adds redundancy check, such as CRC, to each cell before transport on switching fabric. A cell coming into egress processing (e.g., reassembly system 100R) is checked for errors, such as by checking encoding, before the cell is used for reassembly. If errors are detected, then error correction (e.g., forward error correction or backward error correction) corrects the errors in a cell before reassembly. TCAM lookup logic can also detect errors in an incoming cell in egress processing.

Figure 4:
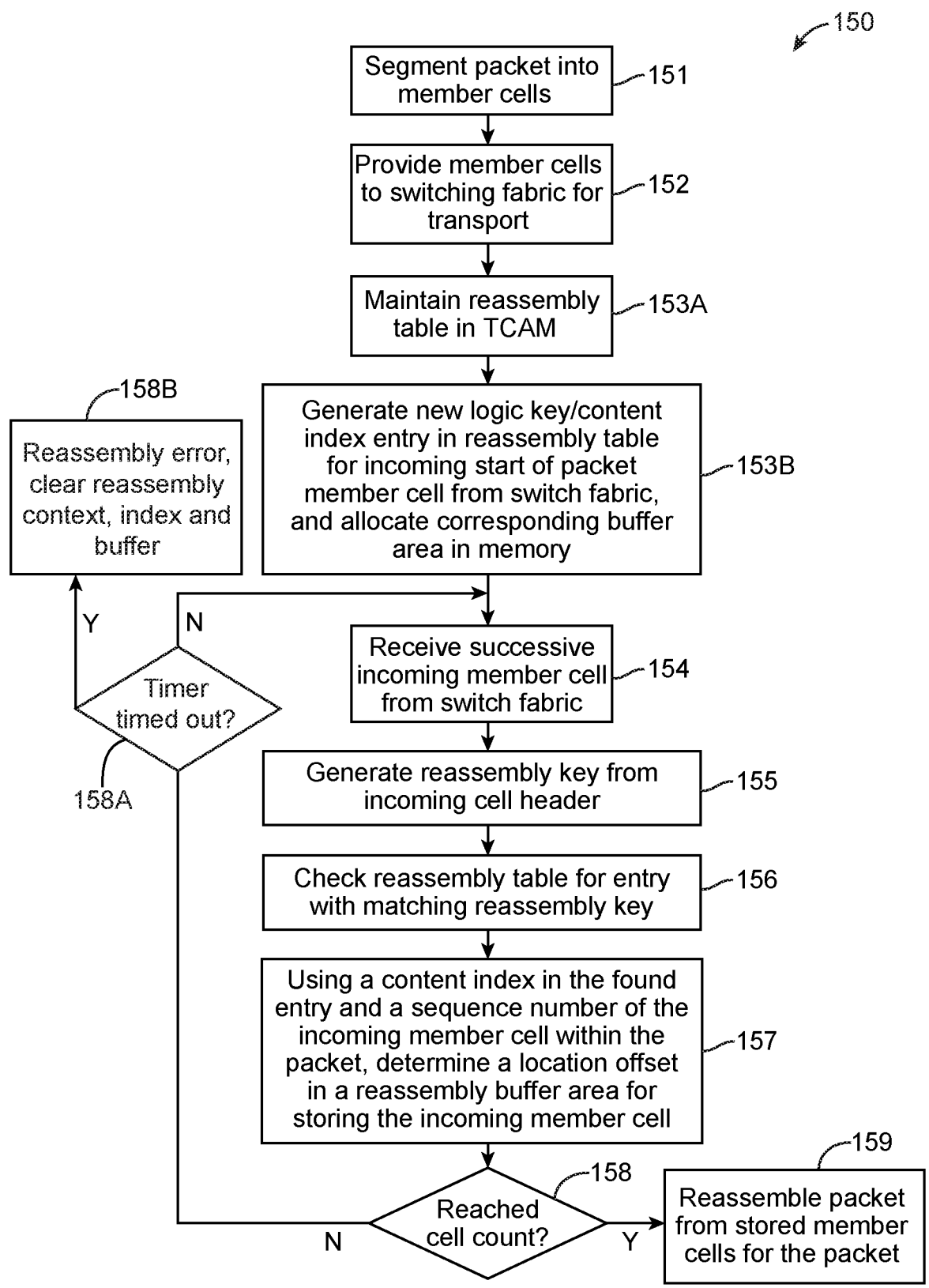
FIG. 4 is a flowchart showing a packet processing system operation, according to an embodiment of the invention.

FIG. 4 is a flowchart of packet processing logic 150, according to an embodiment of the invention. According to an embodiment of the invention, one or more processing blocks of the logic 150 may be implemented in one or more devices and/or switches in a distributed system. In a segmentation phase or ingress device, process block 151 comprises segmenting a packet into member cells for transport on a switching fabric, wherein each member cell includes a header and a segment of the packet payload. In one embodiment, each member cell header includes a payload and a header such that cell headers include common structures with common elements along with a cell sequence number and parity information for error detection and error correction in packet reassembly at the reassembly module. Process block 152 comprises providing the member cells to a switching fabric for transport.

In a reassembly phase or egress device, process block 153A comprises maintaining a reassembly table in a content addressable memory, wherein the reassembly table includes one or more entries corresponding to one or more packets, and wherein each entry comprises a logic key for a corresponding packet and a content index into a reassembly buffer area for storing incoming member cells of that packet.

Process block 153B handles a SOP cell of a packet. In response to a receiving an incoming member cell of a packet that is a SOP cell or if the cell lookup key is not found in the reassembly table (i.e., a non-SOP cell if it arrives ahead of others, out of order) of a packet, process block 153B generates a new logic key using selected information from the SOP (or the received out of order non-SOP) cell header wherein the selected information is the same for all member cells of the packet, allocates an area of the reassembly buffer for storing member cells of the packet, and places a new entry into the reassembly table, wherein the new entry includes said new logic key and a new content index into the reassembly buffer area for storing incoming member cells of that packet. Block 153B also starts a reassembly timer for this context. The packet is reassembled using the stored member cells in the reassembly buffer area for the packet using cell offset number or sequence number from cell header. The cell offset number with respect to the packet is unique for each member cell. The cell offset number or sequence number is not included in the reassembly key formation. In one example, the switching fabric comprises a switched fabric in a distributed information technology environment.

Process block 154 comprises receiving a successive incoming member cell of a packet from a switching fabric wherein each member cell comprises a segment of the packet and a header. Process block 155 comprises generating a reassembly key using selected information from the incoming member cell header wherein the selected information is the same for all member cells of the packet. Process block 156 comprises checking a reassembly table in a content addressable memory to find an entry that includes a logic key matching the reassembly key. Process block 157 comprises using a content index in the found entry and a sequence number of the incoming member cell within the packet, to determine a location offset in a reassembly buffer area for storing the incoming member cell at said location offset in the reassembly buffer area for the packet for reassembly. Process block 158 comprises checking if a member cell count has been reached. If yes, process proceeds to block 159, otherwise the process proceeds to block 158A. Process block 159 comprises reassembling the stored member cells into a packet when a count is reached which indicates all member cells of the packet are present.

Decision block 158A checks if a reassembly timer timed out. If all the cells associated to a packet do not arrive within certain time period starting from receiving the first cell, then in process block 158B the logic declares the reassembly error and clears reassembly context 132, context index 135 and reassembly buffers 131. Otherwise the process proceeds to block 154 for next member cell of the packet.

Figure 5:
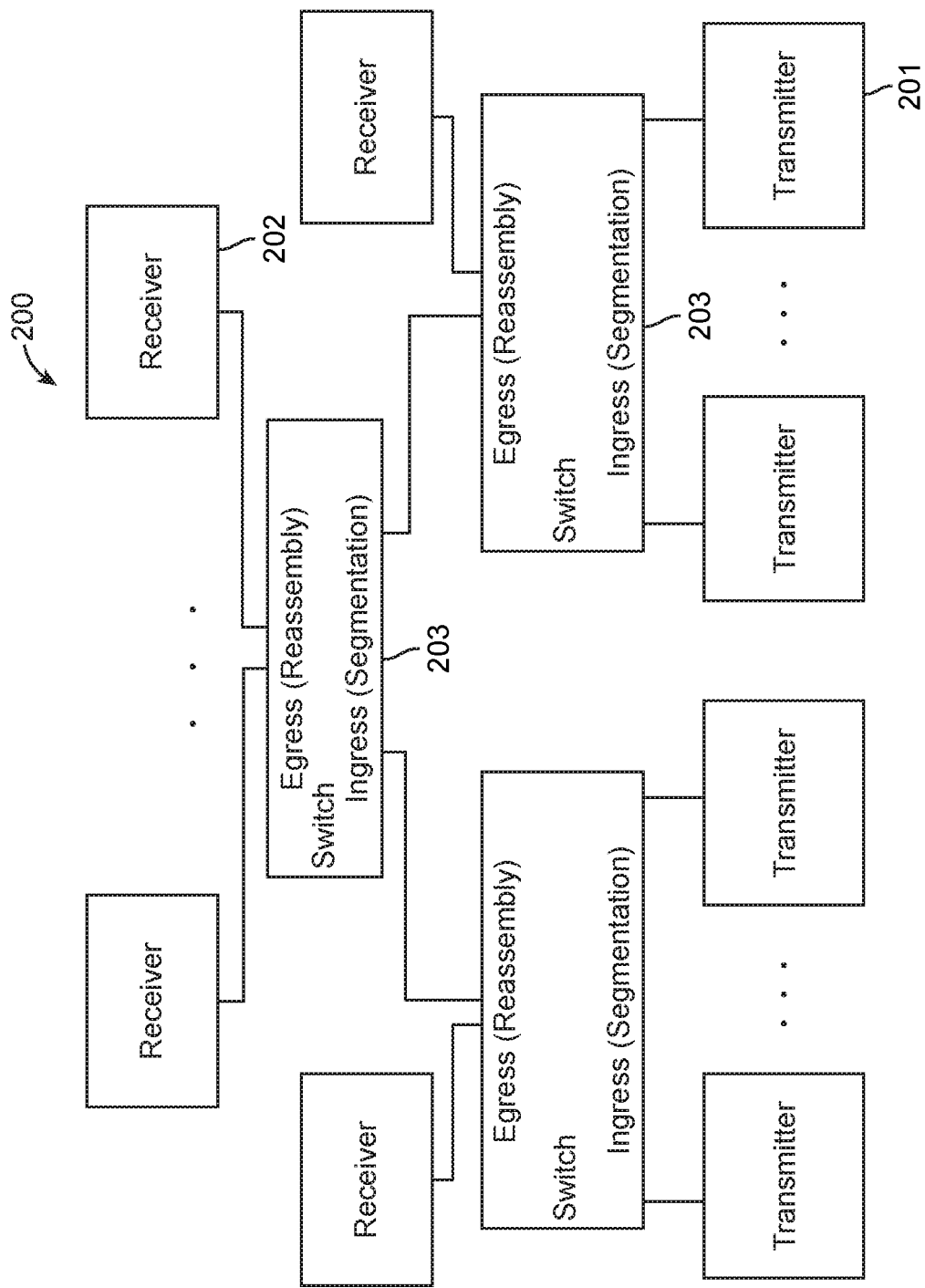
FIG. 5 is a block diagram illustrating another example information technology system utilizing packet processing, according to an embodiment of the present invention.

FIG. 5 is a distributed computing architecture 200 implementing packet processing in a communication network based on asynchronous transfer mode (ATM) switching, according to another embodiment of the invention. In one embodiment, a transmitter device 201 sends packets for delivery to a target receiver 202 via one or more communication switches 203 implementing packet processing according to embodiments of the invention. One or more communication switches 203 implement packet processing comprising segmentation and/or reassembly describe herein, according to embodiments of the invention. A packet from a transmitter 201 is segmented into member cells and transported by the switches 203 in a communication fabric, wherein the member cells are reassembled into a packet for delivery to the target receiver.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for ingress processing, comprising:
   at least one processor; and
   a non-transitory processor-readable memory device storing instructions that when executed by the at least one processor causes the at least one processor to perform operations including:
      receiving a data packet from a source;
      creating member cells from the received data packet, wherein each of the member cells comprises a header including information that is same across all the member cells;
      adding redundancy check to each of the member cells; and
      providing the member cells to a switching fabric for transport to a destination, wherein the member cells are reassembled into a reassembled data packet at the destination based on the information that is same across all the member cells, and the reassembled data packet comprises a copy of each of the member cells without a header of the member cell.

2. The system of claim 1, wherein each of the member cells further comprises a segment of a payload of the received data packet.

3. The system of claim 2, wherein the operations further include:
   saving the information that is same across all the member cells in a buffer as a common structure.

4. The system of claim 3, wherein a header of each of the member cells includes the common structure.

5. The system of claim 2, wherein adding redundancy check to each of the member cells comprises:
   adding, to a header of each of the member cells, a corresponding sequence number for the member cell and parity information for error detection and error correction.

6. The system of claim 1, wherein the source comprises a transmitter device, and the destination comprises a receiver device.

7. The system of claim 1, wherein creating member cells from the received data packet comprises:
   segmenting the received data packet into the member cells.

8. The system of claim 1, wherein the operations further include:
   maintaining a context table providing a status of each received data packet.

9. A system for egress processing, comprising:
   at least one processor; and
   a non-transitory processor-readable memory device storing instructions that when executed by the at least one processor causes the at least one processor to perform operations including:
      receiving member cells from a switching fabric, wherein each of the member cells comprises a header including information that is same across all the member cells;
      checking the member cells for errors; and
      reassembling the member cells into a reassembled data packet based on the information that is same across all the member cells, wherein the reassembled data packet comprises a copy of each of the member cells without a header of the member cell, and the reassembled data packet is delivered to a destination.

10. The system of claim 9, wherein a header of each of the member cells comprises a corresponding sequence number for the member cell and parity information for error detection and error correction.

11. The system of claim 10, wherein reassembling the member cells into a reassembled data packet comprises:
    for a first member cell of the member cells:
       constructing a first packet buffer context in a reassembly buffer based on a context of the first member cell;
       generating a copy of the first member cell without its header; and
       placing the copy of the first member cell in the first packet buffer context.

12. The system of claim 11, wherein reassembling the member cells into a reassembled data packet further comprises:
    for each remaining member cell of the member cells:
       determining whether a context of the remaining member cell matches the first packet buffer context; and
       in response to determining the context of the remaining member cell matches the first packet buffer context:
          generating a copy of the remaining member cell without its header; and
          placing the copy of the remaining member cell in sequence in the first packet buffer context based on a corresponding sequence number for the remaining member cell.

13. The system of claim 12, wherein reassembling the member cells into a reassembled data packet further comprises:
    providing content of the first packet buffer context as the reassembled data packet.

14. The system of claim 12, wherein the operations further include:
    maintaining a reassembly table comprising an entry corresponding to the reassembled data packet, wherein the entry comprises a logic key for the reassembled data packet and a content index into the reassembly buffer for storing copies of the member cells.

15. The system of claim 14, wherein reassembling the member cells into a reassembled data packet further comprises:

for each of the member cells:
- generating a reassembly key based on a header of the member cell;
- performing a lookup of the reassembly table utilizing the reassembly key, wherein the lookup finds the entry if the logic key of the entry matches the reassembly key; and
- in response to finding the entry, utilizing the content index of the entry and a corresponding sequence number for the member cell to determine a location offset in the reassembly buffer for storing a copy of the member cell.

16. The system of claim 15, wherein algorithm complexity for the lookup is O(1).

17. The system of claim 9, wherein the destination comprises a receiver device.

18. The system of claim 9, wherein the operations further include:
- correcting the errors in the member cells before the member cells are reassembled into the reassembled data packet.

\* \* \* \* \*